(12) United States Patent
Jinno et al.

(10) Patent No.: US 11,105,773 B2
(45) Date of Patent: Aug. 31, 2021

(54) COIL-TYPE EDDY CURRENT FLAW DETECTING PROBE

(71) Applicant: MITSUBISHI HEAVY INDUSTRIES, LTD., Tokyo (JP)

(72) Inventors: Kentaro Jinno, Tokyo (JP); Masaaki Kurokawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 137 days.

(21) Appl. No.: 16/478,973

(22) PCT Filed: Mar. 1, 2018

(86) PCT No.: PCT/JP2018/007674
§ 371 (c)(1),
(2) Date: Jul. 18, 2019

(87) PCT Pub. No.: WO2018/168480
PCT Pub. Date: Sep. 20, 2018

(65) Prior Publication Data
US 2019/0353618 A1  Nov. 21, 2019

(30) Foreign Application Priority Data
Mar. 13, 2017  (JP) .............................. JP2017-047742

(51) Int. Cl.
*G01N 27/904* (2021.01)
*G01N 27/90* (2021.01)

(52) U.S. Cl.
CPC ....... *G01N 27/904* (2013.01); *G01N 27/9006* (2013.01)

(58) Field of Classification Search
CPC . G01N 27/902; G01N 27/904; G01N 27/9006
See application file for complete search history.

(56) References Cited

U.S. PATENT DOCUMENTS

| 4,808,924 A | 2/1989 | Cecco et al. |
| 5,506,503 A * | 4/1996 | Cecco ................... G01N 27/902 324/220 |

(Continued)

FOREIGN PATENT DOCUMENTS

JP    5922633 B2    5/2016

OTHER PUBLICATIONS

International Search Report dated Apr. 24, 2018, issued in counterpart Application No. PCT/JP2018/007674, with English translation (4 pages).

(Continued)

*Primary Examiner* — Jay Patidar
(74) *Attorney, Agent, or Firm* — Westerman, Hattori, Daniels & Adrian, LLP

(57) ABSTRACT

An eddy current flaw detecting probe includes a plurality of excitation coils (3) which is configured to generate an eddy current in an inspection target and a plurality of detection coils (4) which are differentially connected to each other. The plurality of detection coils (4) includes a first detection coil (41) which is disposed on a second center line (4a) intersecting a first center line (3a) which connects a center of a first excitation coil (31) and a center of a second excitation coil (32) to each other and a second detection coil (42) which is disposed on a side opposite to the first detection coil (41) on the second center line (4a). The excitation coil (3) and the detection coil (4) are disposed to be inclined toward an inspection target surface as approaching each other.

4 Claims, 7 Drawing Sheets

(56) References Cited

U.S. PATENT DOCUMENTS

| | | | |
|---|---|---|---|
| 6,018,242 A | 1/2000 | Piriou et al. | |
| 7,705,589 B2* | 4/2010 | Kim .................. | G01N 27/9006 324/240 |
| 2011/0068783 A1 | 3/2011 | Nonogaki | |
| 2015/0108970 A1 | 4/2015 | Kurokawa et al. | |
| 2015/0177191 A1 | 6/2015 | Hardy et al. | |

OTHER PUBLICATIONS

Written Opinion dated Apr. 24, 2018, issued in counterpart Application No. PCT/JP2018/007674, with English Translation (8 pages).

* cited by examiner

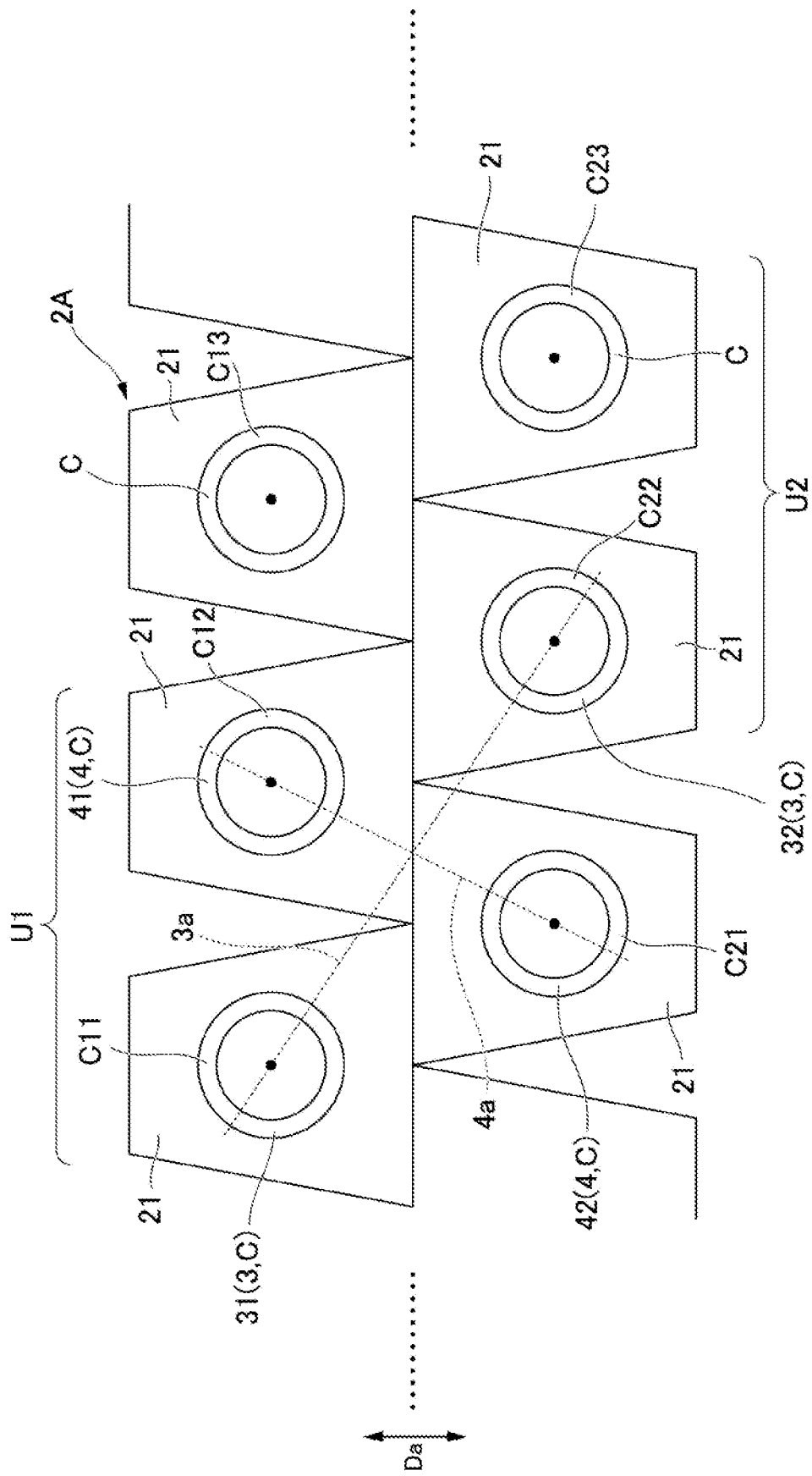

COIL-TYPE EDDY CURRENT FLAW DETECTING PROBE

TECHNICAL FIELD

The present invention relates to an eddy current flaw detecting probe.

Priority is claimed on Japanese Patent Application No. 2017-047742, filed on Mar. 13, 2017, the content of which is incorporated herein by reference.

BACKGROUND ART

An Eddy Current Testing (ECT) is known as a method for nondestructively inspecting a defect such as flaw and thinning in a member formed of a metallic material such as a pipe. In the Eddy Current Testing, an eddy current is generated on a surface of an inspection object by an excitation coil and a voltage change (or impedance change) of a detection coil due to influences of the eddy current is observed. Accordingly, the defect generated in the inspection object is detected.

For example, an eddy current flaw detecting probe used in the Eddy Current Testing is described in Patent Document 1. The eddy current flaw detecting probe described in Patent Document 1 is a multi-coil type probe in which a plurality of excitation coils and a plurality of detection coils are disposed on the same surface.

CITATION LIST

Patent Literature

[Patent Document 1] Japanese Patent No. 5922633

SUMMARY OF INVENTION

Technical Problem

Meanwhile, in the above-described probe, detection performance may deteriorate depending on a position of the defect with respect to the excitation coil. Particularly, in a case where the defect is positioned between the excitation coil and the detection coil, the detection performance of the defect deteriorates. Accordingly, it is desirable to detect the defect positioned between the excitation coil and the detection coil with high accuracy.

The present invention provides an eddy current flaw detecting probe capable of detecting the defect positioned between the excitation coil and the detection coil with high accuracy.

Solution to Problem

According to a first aspect of the present invention, there is provided an eddy current flaw detecting probe which is configured to approach an inspection target surface of an inspection target and detect a change of an eddy current generated in the inspection target, and thereby perform a flaw detection test, the eddy current flaw detecting probe including: a plurality of excitation coils which is configured to generate an alternating magnetic field so as to generate the eddy current in the inspection target; and a plurality of detection coils which are differentially connected to each other, in which the plurality of excitation coils include a first excitation coil and a second excitation coil which is disposed at a distance from the first excitation coil, the plurality of detection coils include a first detection coil which is disposed on a second center line intersecting a first center line which connects a center of the first excitation coil and a center of the second excitation coil to each other and a second detection coil which is disposed on a side opposite to the first detection coil according to the first center line on the second center line, and one of the excitation coils and one of the detection coils are disposed to be inclined toward the inspection target surface as the one of the excitation coils and the one of the detection coils approach each other.

According to this configuration, the excitation coil and the detection coil are inclined toward the inspection target surface as the excitation coil and the detection coil approach each other. Accordingly, compared to a case where the excitation coil and the detection coil are disposed on the same surface without being inclined. Eddy current between the excitation coil and the detection coils is enhanced relatively. As a result, in a case where there is a defect in the inspection target, the disturbance is generated in the eddy current, and a voltage difference is also enhanced between the detection coils.

In addition, in the eddy current flaw detecting probe according to a second embodiment of the present invention, in the first aspect, the one of the excitation coils and the one of the detection coils may be inclined so as to be symmetrical to each other with a virtual horizontal plane between the one of the excitation coils and the one of the detection coils as a boundary.

According to this configuration, the eddy current generated between the excitation coil and the detection coil can be enhanced relatively. As a result, in the case where there is a defect in the inspection target, the disturbance is easily generated in the eddy current, and the voltage difference is also enhanced between the detection coils.

In addition, in the eddy current flaw detecting probe according to a third embodiment of the present invention, in the first or second aspect, a center position of the second detection coil may be disposed between a center position of the first excitation coil and a center position of the first detection coil in a direction in which the first excitation coil and the first detection coil are adjacent to each other.

According to this configuration, a position of the detection coil with respect to the excitation coil is staggered. Therefore, it is possible to further disturb the eddy current distribution. As a result, in the case where there is a defect in the inspection target, the disturbance is easily generated in the eddy current, and a voltage difference is also enhanced between the detection coils. Accordingly, it is possible to improve the detection accuracy of the defect.

In addition, in the eddy current flaw detecting probe according to fourth embodiment of the present invention, in any one of the first to third aspects, the eddy current flaw detection probe further including: a tubular coil holder, in which the plurality of excitation coils and the plurality of detection coils may be fixed to an inner peripheral surface of the coil holder such that a direction in which the first excitation coil and the first detection coil are adjacent to each other is a circumferential direction of the coil holder.

According to this configuration, when a tubular inspection target is inspected from the inside thereof, a flaw detection test can be efficiently performed.

Moreover, in the eddy current flaw detecting probe according to a fifth embodiment of the present invention, in the fourth aspect, the one of the excitation coils and the one of the detection coils may be constituted by the same coil, and the plurality of excitation coils and the plurality of detection coils may be disposed so as to be equally spaced apart over the entire circumference of the coil holder.

According to this configuration, when a tubular inspection target is inspected from the inside thereof the flaw detection test can be efficiently performed with high accuracy over the entire circumference.

Advantageous Effects of Invention

According to the present invention, it is possible to detect a defect positioned between an excitation coil and a detection coil with high accuracy.

BRIEF DESCRIPTION OF DRAWINGS

FIG. 9 is a partial exploded view of FIG. 8 showing dispositions of a plurality of excitation coils and a plurality of detection coils according to the second embodiment of the present invention.

DESCRIPTION OF EMBODIMENTS

First Embodiment

Hereinafter, a first embodiment of the present invention will be descried with reference to FIGS. 1 to 4.

Figure 1:
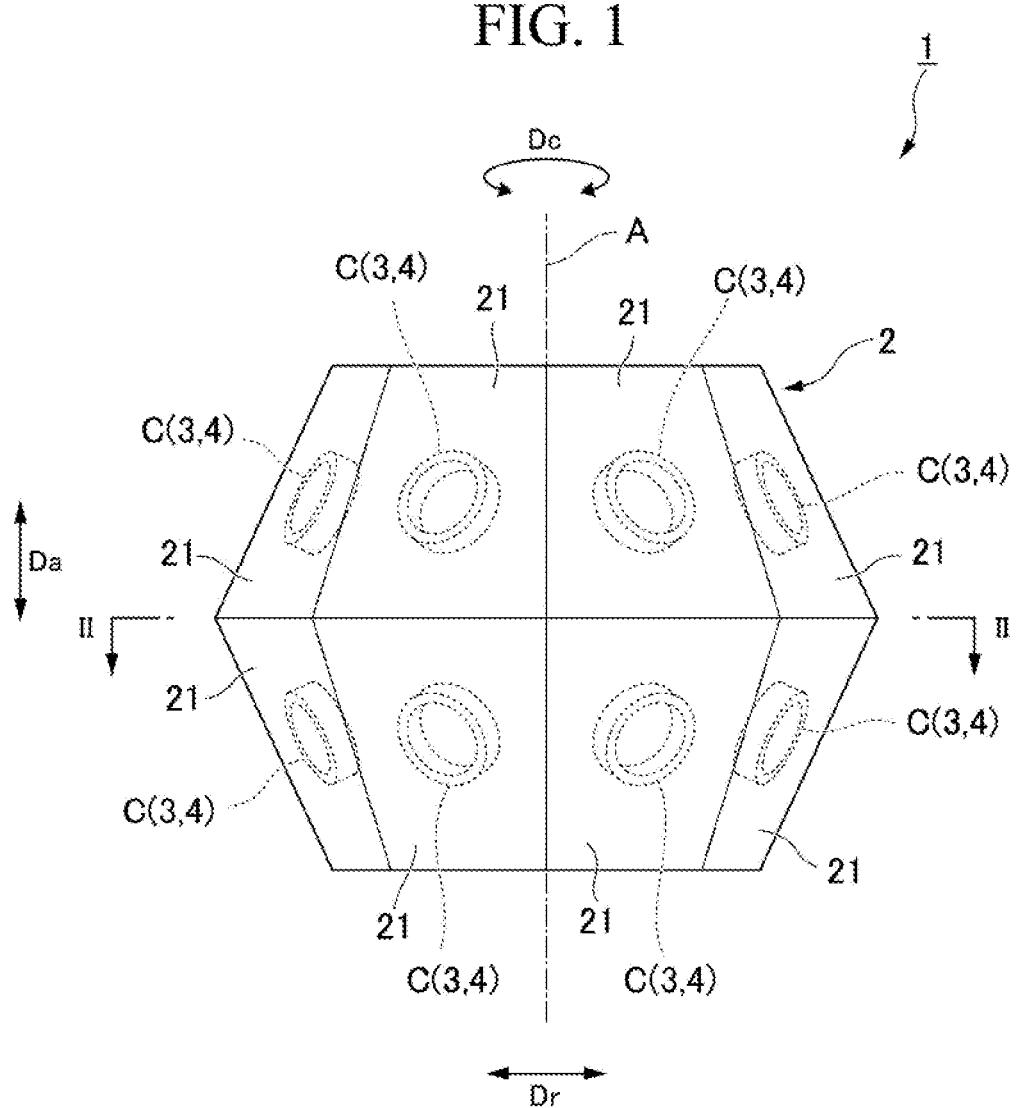
FIG. 1 is a side view showing a schematic configuration of an eddy current flow detecting probe according to a first embodiment of the present invention.

An eddy current flaw detecting probe 1 approaches an inspection target surface 81 of an inspection target 8 and detects a change of an eddy current generated in the inspection target 8 to perform a flaw detection test. The eddy current flaw detecting probe 1 detects a flaw and thinning of the inspection target 8 by eddy current flaw detection. Hereinafter, the flaw and the thinning will be generically referred to as a defect. The eddy current flaw detecting probe 1 of the present embodiment is a multi-coil type probe in which coils C are arranged on an array in two stages. For example, as the inspection target 8, a cylindrical pipe formed of metal can be mentioned. As shown in FIG. 1, the eddy current flaw detecting probe 1 of the present embodiment includes a coil holder 2, a plurality of excitation coils 3, and a plurality of detection coils 4.

Figure 2:
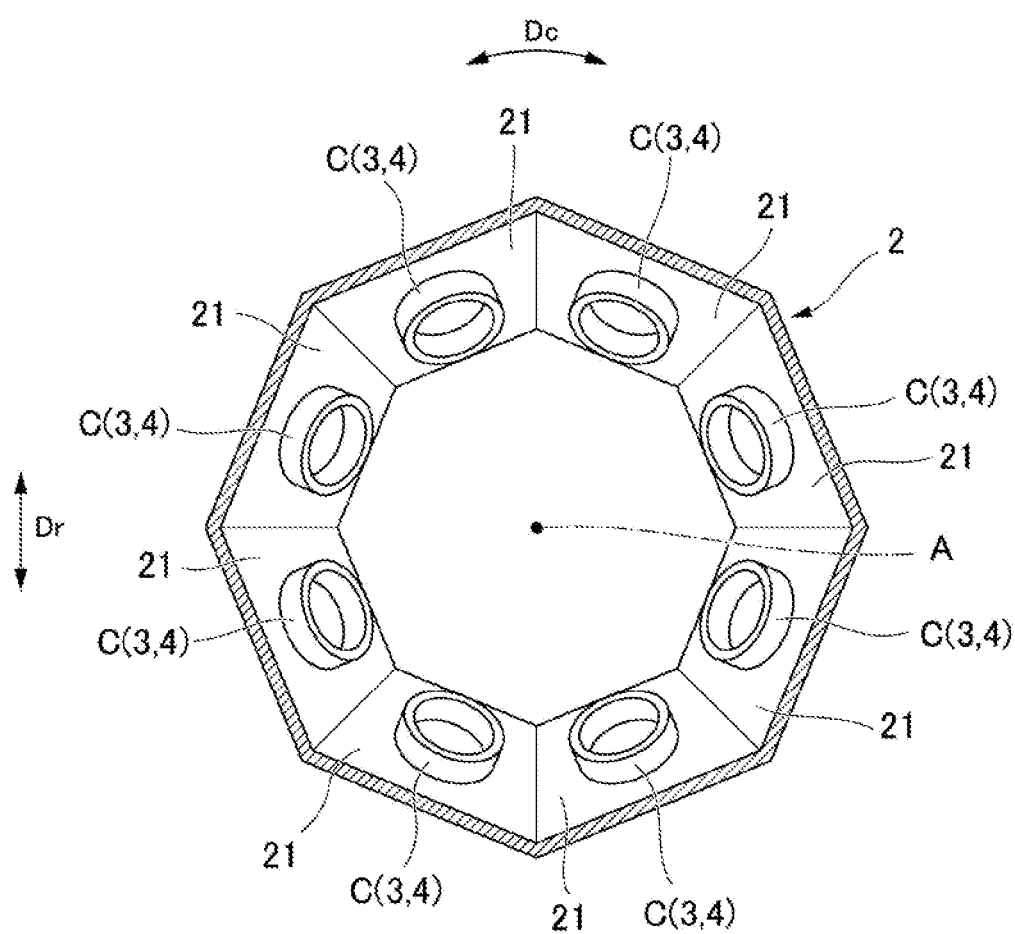
FIG. 2 is a sectional view taken along line II-II in FIG. 1.

The coil holder 2 is formed in a tubular shape extending along a center axis A. As shown in FIG. 2, in the present embodiment, the coil holder 2 whose cross section orthogonal to the center axis A is formed in a regular octagonal shape. As shown in FIG. 1, a diameter of the coil holder 2 decreases such that a cross section thereof gradually decreases as the cross section is away from an intermediate position in an axial direction Da in which the center axis A extends. The excitation coils 3 and the detection coils 4 are fixed to an inner peripheral surface and an outer peripheral surface of the coil holder 2. The coil holder 2 has a plurality of holder bodies 21.

The holder body 21 has a trapezoidal flat plate shape. The holder main body 21 has a symmetrically trapezoidal shape in which a long side and a short side are parallel to each other. The plurality of holder main bodies 21 are combined with each other so that the long side of the holder main body 21 is positioned at an intermediate position in the axial direction Da of the coil holder 2. The plurality of holder main bodies 21 are combined with each other to be inclined so as to protrude outward in a radial direction Dr about the center axis A as approaching another holder main body 21 adjacent in the axial direction Da. That is, each holder body 21 is disposed to be inclined with respect to the axial direction Da so as to approach the center axis A from the long side toward the short side. In addition, the plurality of holder main bodies 21 are combined with each other to be inclined so as to protrude outward in the radial direction Dr as approaching another holder main body 21 adjacent in a circumferential direction Dc about the center axis A. As a result, in the coil holder 2, a connecting portion between the holder main bodies 21 is convex toward the outside in the radial direction Dr about the center axis A.

The plurality of excitation coils 3 generate an alternating magnetic field so as to generate an eddy current in the inspection target 8. The plurality of excitation coils 3 according to the present embodiment include a first excitation coil 31 and a second excitation coil 32. One of the excitation coils 3 is connected to an oscillator (not shown) which supplies an alternating current. Phase of alternating current in the excitation coil 31 is 180 degree deferent from phase of alternating current in the excitation coil 32. As the excitation coil 3, a coil obtained by shaping a coiled coil obtained by winding an electric wire into an annular shape is used.

In a case where it is not necessary to distinguish each of the first excitation coil 31 and the second excitation coil 32, the first excitation coil 31 and the second excitation coil 32 are simply referred to as the excitation coil 3. In addition, in a case where it is necessary to distinguish the first excitation coil 31 and the second excitation coil 32 from each other, they are referred to as the first excitation coil 31 and the second excitation coil 32. This also applies to the detection coil 4 to be described later.

The plurality of detection coils 4 are differentially connected to each other. The plurality of detection coils 4 of the present embodiment includes a first detection coil 41 and a second detection coil 42. Like the excitation coil 3, as one of the detection coils 4, a coil obtained by shaping a coiled coil obtained by winding an electric wire into an annular shape is used. A pair of detection coils 4 differentially connected is connected to a bridge circuit (not shown). If voltages generated in the pair of detection coils 4 are different, a signal indicating that a defect is detected is output from the bridge circuit.

In the present embodiment, the first excitation coil 31, the second excitation coil 32, the first detection coil 41, and the second detection coil 42 are constituted by the same coil C having the same electromagnetic characteristics. The plurality of excitation coils 3 and the plurality of detection coils 4 are fixed to an inner circumferential surface of the coil holder 2 such that a direction in which the first excitation coil 31 and the first detection coil 41 are adjacent to each other is the circumferential direction Dc. The plurality of excitation coils 3 and detection coils 4 are disposed so as to be equally spaced apart over the entire circumference of the coil holder 2. The plurality of excitation coils 3 and detection coils 4 are fixed on the inner circumferential surface of the coil holder 2 such that a direction of the first excitation coil 31 and the second detection coil 42 are adjacent to each other is the axial direction Da.

Specifically, in the eddy current flaw detecting probe 1 of the present embodiment, two coils C are arranged in the axial direction Da, and eight coils C are arranged in the circumferential direction Dc. Therefore, in the present embodiment, sixteen coils C are arranged in an array in the axial direction Da and the circumferential direction Dc. All sixteen coils C have the same electromagnetic characteristics. Only one coil C is disposed for one holder body 21.

In the eddy current flaw detecting probe 1, four coils C which are provided in two columns in the circumferential direction Dc and in two rows in the axial direction Da and are disposed to be closest to each other become a minimum unit (probe unit U) and constitutes one channel. In the multi-coil type eddy current flaw detecting probe 1, a plurality of channels are formed while overlapping one row of a plurality of columns of coils C adjacent to each other in circumferential direction Dc. Therefore, in the coil C of the present embodiment, a function as the detection coil 4 or the excitation coil 3 is not determined in advance. If one coil C sometimes functions as the detection coil 4, the same coil C may function as the excitation coil 3. An electric wire (not shown) connected to the bridge circuit or the oscillator is connected to each coil C via a switch circuit. When the coil C functions as an excitation coil 3, an excitation current is supplied to the coil C from the electric wire. Moreover, when the coil C functions as the detection coil 4, a voltage difference between the pair of coils C is reflected on the corresponding electric wire.

Figure 3:
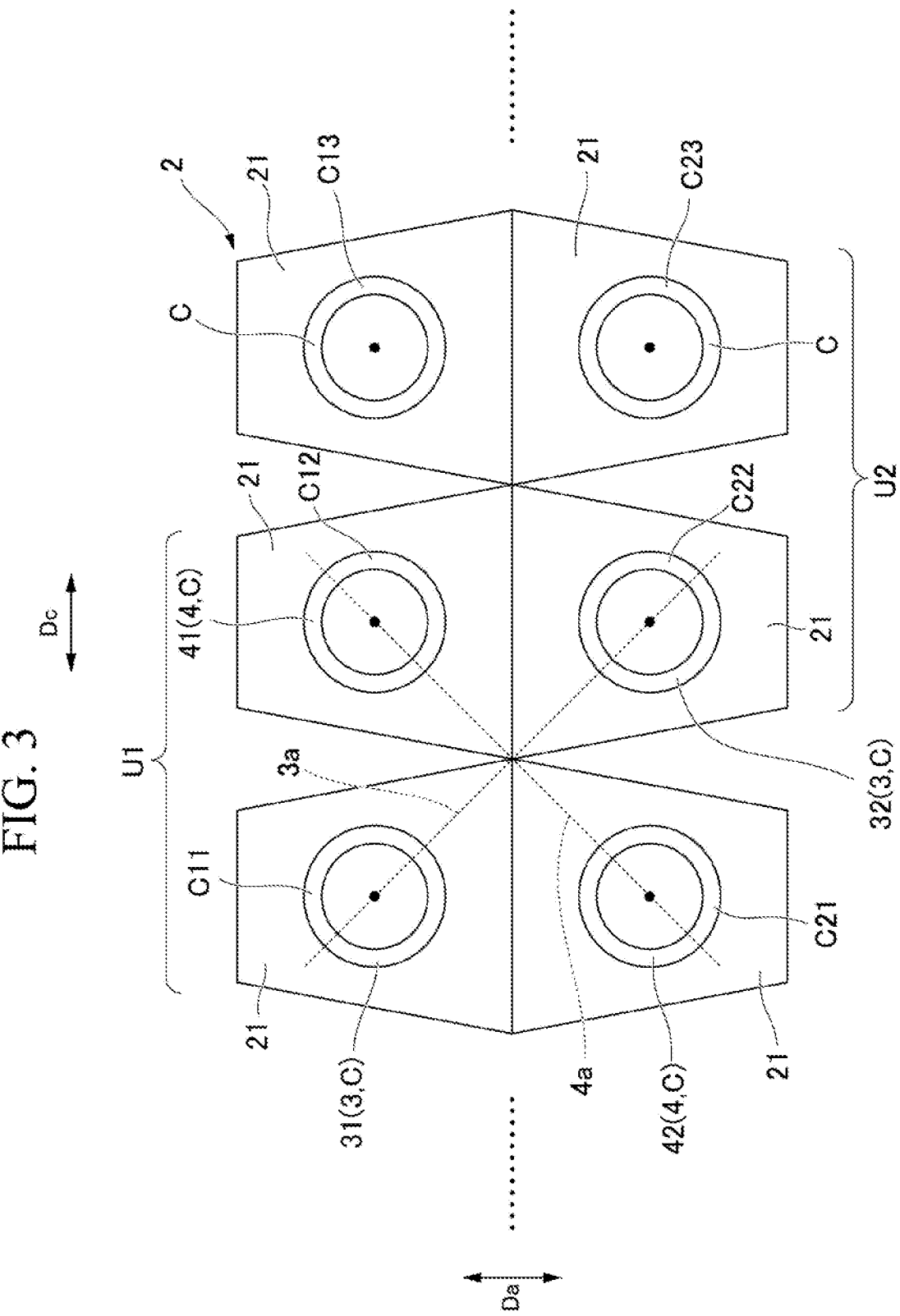
FIG. 3 is a partial exploded view of FIG. 1 showing dispositions of a plurality of excitation coils and a plurality of detection coils according to the first embodiment of the present invention.

Here, the dispositions of the excitation coil 3 and the detection coil 4 will be described with one probe unit U as an example. FIG. 3 shows a portion of an aspect in which the coil holder 2 is developed and disposed on the plane in order to explain the dispositions of the respective coils C. As shown in FIG. 3, the second excitation coil 32 is disposed at a distance from the first excitation coil 31. Specifically, the second excitation coil 32 is disposed at a distance from the first excitation coil 31 in the circumferential direction Dc and the axial direction Da.

The first detection coil 41 is disposed at a distance from the first excitation coil 31 and the second excitation coil 32. The first detection coil 41 is disposed on a second center line 4a intersecting a first center line 3a which connects a center of the first excitation coil 31 and a center of the second excitation coil 32 to each other. In the present embodiment, the first center line 3a and the second center line 4a are orthogonal to each other. The first center line 3a and the second center line 4a extend in a direction inclined by 45° with respect to the axial direction Da and the circumferential direction Dc. The first detection coil 41 is disposed such that a center position in the axial direction Da coincides with that of the first excitation coil 31. The first detection coil 41 is disposed such that a center position in the circumferential direction Dc coincides with that of the second excitation coil 32.

The second detection coil 42 is disposed at a distance from the first excitation coil 31, the second excitation coil 32, and the first detection coil 41. The second detection coil 42 is disposed on the second center line 4a on a side opposite to the first detection coil 41 according to the first center line 3a. The second detection coil 42 is disposed such that a center position in the axial direction Da coincides with that of the second excitation coil 32. The second detection coil 42 is disposed such that a center position in the circumferential direction Dc coincides with that of the first excitation coil 31.

Figure 4:
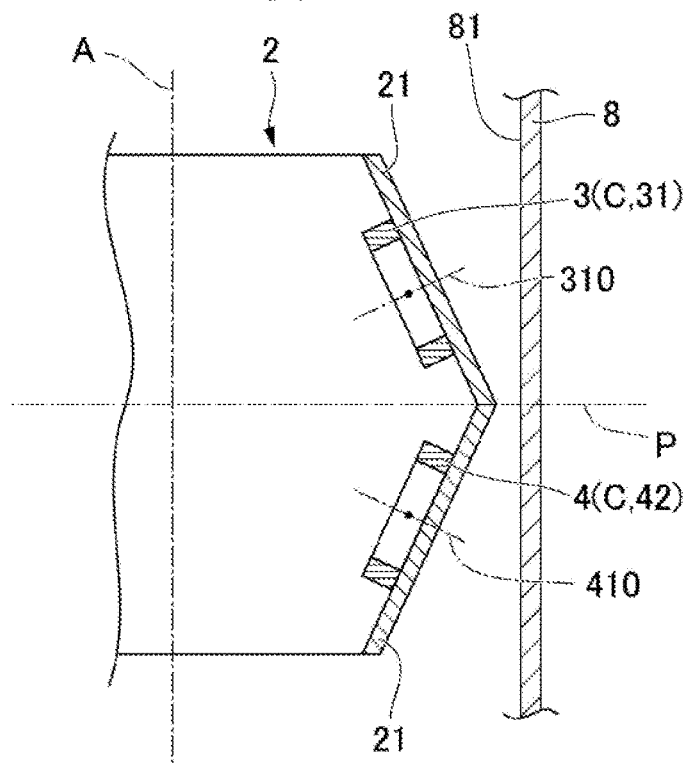
FIG. 4 is a sectional view showing inclinations of the excitation coils and the detection coils according to the embodiment of the present invention.

In addition, as shown in FIG. 1, the coils C are disposed so as to be inclined outward in the radial direction Dr as the coils C approach each other. Accordingly, as shown in FIG. 4, the excitation coil 3 and the detection coil 4 are disposed so as to be inclined toward the inspection target surface 81 as they approach each other. The excitation coil 3 and the detection coil 4 are inclined so as to be symmetrical with respect to a boundary between the excitation coil 3 and the detection coil 4. Specifically, the excitation coil 3 and the detection coil 4 adjacent to each other in the axial direction Da are inclined at the same angle with respect to the center axis A of the coil holder 2 so as to be symmetrical with respect to a virtual horizontal plane P passing through a connection surface between the holder bodies 21 adjacent to each other in the axial direction Da.

Here, the first excitation coil 31 and the second detection coil 42 will be described in more detail as an example. As shown in FIG. 4, a coil center line 310 passing through a center position of the first excitation coil 31 and a coil center line 410 passing through a center position of the second detection coil 42 are disposed to be inclined to each other with respect to the center axis A and the virtual horizontal plane P. In this case, magnitudes of angles of the coil center line 310 of the first excitation coil 31 and the coil center line 410 of the second detection coil 42 with respect to the center axis A and the virtual horizontal plane P are the same as each other. In addition, the first excitation coil 31 and the second detection coil 42 are disposed at positions at which distances from the virtual horizontal plane P to respective center positions are the same as each other. In addition, similarly to the first excitation coil 31 and the second detection coil 42, the second excitation coil 32 and the first detection coil 41 are disposed to be inclined to each other with respect to the center axis A and the virtual horizontal plane P.

Moreover, in FIG. 4, although a cross section parallel to the axial direction Da is shown, in a cross section orthogonal to the center axis A, the excitation coil 3 and the detection coil 4 adjacent to each other in the circumferential direction Dc are disposed to be inclined to each other. Therefore, the first excitation coil 31 and the first detection coil 41 are disposed to be inclined to each other with respect to the center axis A and the virtual horizontal plane P. Similarly, the second exciting coil 32 and the second detecting coil 42 are disposed to be inclined to each other with respect to the center axis A and the virtual horizontal plane P.

Here, an operation of the eddy current flaw detecting probe 1 will be described with reference to FIG. 3 using three coils C11, C12, and C13 adjacent to each other in circumferential direction Dc and three coils C21, C22, and C23 adjacent to the three coils C in the axial direction Da. As shown in FIG. 3, in the eddy current flaw detecting probe 1, the coils C11, C12, C21, and C22 are used as the probe unit U (first unit U1) at the beginning of the flaw detection. In the first unit U1, the coil C11 functions as the first excitation coil 31 and the coil C22 functions as the second excitation coil 32. At the same time, the coil C21 functions as the first detection coil 41 and the coil C12 functions as the second detection coil 42.

If the excitation current is supplied to the first excitation coil 31 and the second excitation coil 32, a pair of eddy currents is formed near surfaces of the first excitation coil 31 and the second excitation coil 32. The eddy currents are added and a strong eddy current (composite eddy current) is generated from the second detection coil 42 toward the first detection coil 41. In this state, inter-linkage magnetic fluxes in opposite directions act on the first detection coil 41 and the second detection coil 42, respectively. In a case where there is no defect in the inspection target 8, disturbance does not act on the eddy current, and thus, there is no difference in the inter-linkage magnetic fluxes acting on the first detection coil 41 and the second detection coil 42. Therefore, there is no difference in the voltages occurring in the first detection coil 41 and the second detection coil 42 according to the inter-linkage magnetic fluxes. For this reason, a signal is not generated from the bridge circuit. Meanwhile, in a case where there is a defect in the inspection target 8, disturbance occurs in the eddy current, and thus, the inter-linkage magnetic fluxes generated by the eddy current also have a nonuniform distribution. Therefore, a difference occurs in a sum of the inter-linkage magnetic fluxes acting on the first detection coil 41 and the second detection coil 42. As a result, a difference occurs in the voltages generated in the first detection coil 41 and the second detection coil 42, and a signal is output from the bridge circuit by the voltage difference.

If the flaw detection is performed for a necessary time by the first unit U1, switching to the coils C12, C13, C22, and C23 constituting the next probe unit U (second unit U2) is performed, and the flaw detection is performed. In this case, the function of the coil C12 is switched from the first detection coil 41 to the first excitation coil 31, and the coil C23 functions as the second excitation coil 32. At the same time, the function of the coil C22 is switched from the second detection coil 42 to the second excitation coil 32, and the coil C13 functions as the second detection coil 42. In this case, an alternating current is supplied to the coil C13 and the coil C22, and a voltage difference between the coil C23 and the coil C12 is detected. In this way, flaw detection processing is performed by moving the coil holder 2 in the axial direction Da with respect to the inspection target 8 while switching the functions of the coils C.

According to the eddy current flaw detecting probe 1 as described above, the first excitation coil 31 and the second detection coil 42 are inclined outward in the radial direction Dr so as to approach the inspection target surface 81 as the first excitation coil 31 and the second detection coil 42 approach each other with respect to the virtual horizontal plane P. Similarly, the second excitation coil 32 and the first detection coil 41, the first excitation coil 31 and the first detection coil 41, and the second excitation coil 32 and the second detection coil 42 are disposed to be inclined. Accordingly, compared to a case where the excitation coil 3 and the detection coil 4 are disposed on the same surface without being inclined, the eddy currents generated between the excitation coil 3 and the detection coil 4 can be enhanced relatively. As a result, in a case where there is a defect in the inspection target 8, the disturbance is easily generated in the eddy current, and a voltage difference is also enhanced between the detection coils 4. Accordingly, it is possible to detect a defect positioned between the excitation coil 3 and the detection coil 4 with high accuracy.

In addition, the excitation coil 3 and the detection coil 4 are inclined at the same angle with respect to the virtual horizontal plane P. As a result, the eddy current generated between the excitation coil 3 and the detection coil 4 can be disturbed with a good balance with respect to the excitation coil 3 and the detection coil 4. As a result, in the case where there is a defect in the inspection target 8, the disturbance is easily generated in the eddy current, and the voltage difference is easily generated between the detection coils 4. Accordingly, it is possible to detect a defect positioned between the excitation coil 3 and the detection coil 4 with high accuracy.

Moreover, in the coil holder 2, the coils C are arranged such that the direction in which the first excitation coil 31 and the first detection coil 41 are adjacent to each other is the circumferential direction Dc. Therefore, when a tubular inspection target 8 such as a metal pipe is inspected from the inside thereof, a flaw detection test can be efficiently performed.

In addition, the coils C are evenly disposed in the circumferential direction Dc with respect to the entire circumference of the coil holder 2. Therefore, when the tubular inspection target 8 is inspected from the inside thereof, the flaw detection test can be efficiently performed with high accuracy over the entire circumference.

Here, the defect capable of being detected with high accuracy by inclining the excitation coil 3 and the detection coil 4 to each other will be described using a simulation result.

Figure 5:
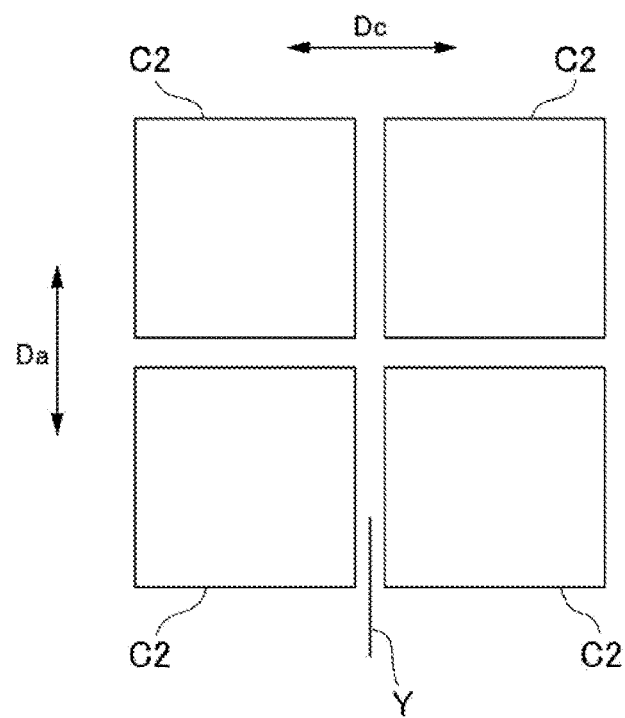
FIG. 5 is a schematic view showing shapes and dispositions of the coils in a simulation.
Figure 6:
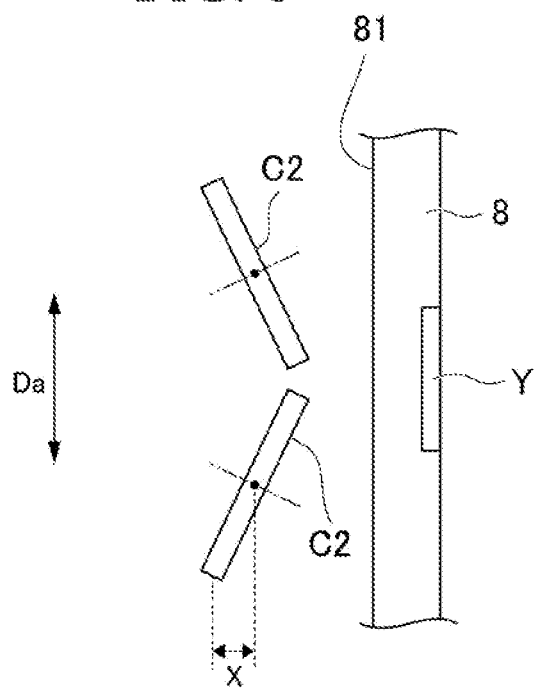
FIG. 6 is a schematic view showing the inclinations of the coils in the simulation.
Figure 7:
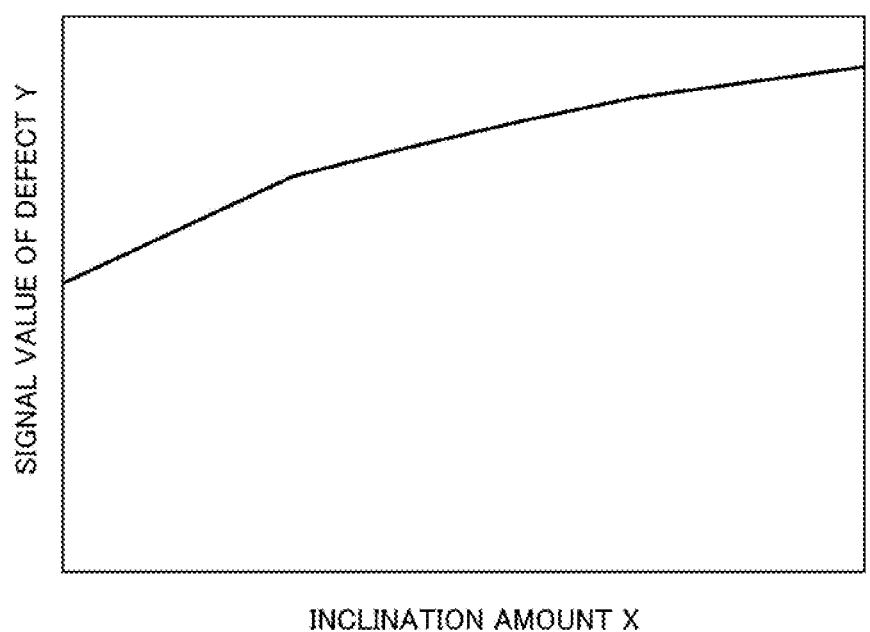
FIG. 7 is a graph showing a relationship between a signal value of a defect and an inclination amount which are simulation results.

As shown in FIG. 5, the simulation was performed by simulating four rectangular coils C2. The four coils C2 are equally spaced apart from each other in the circumferential direction Dc and the axial direction Da. As viewed in the circumferential direction Dc, as shown in FIG. 6, the coils C2 are disposed to be inclined outward as the coils C2 approach each other. In the simulation, the four coils C2 was treated as the probe units U. In the probe unit U, when an inclination amount X of the coil C2 was changed, a signal value at the time of detecting a defect Y between the coils C2 adjacent to each other in the circumferential direction Dc was calculated. As a result, as shown in FIG. 7, it was confirmed that a signal value of defect Y also increased as the inclination amount X increased. Since the signal value increases, in the probe unit U, the defect Y can be detected with higher accuracy. Therefore, from the simulation result, it was confirmed that the defect can be detected with high accuracy by inclining the excitation coil 3 and the detection coil 4.

Second Embodiment

Next, a second embodiment of an eddy current flaw detecting probe 1A of the present invention will be described with reference to FIGS. 8 and 9. In the eddy current flaw detecting probe 1A shown in the second embodiment, the dispositions of the coils C are different from those of the first embodiment. Therefore, in descriptions of the second embodiment, the same reference numerals are assigned to the same portions as those of the first embodiment, and overlapping descriptions thereof are omitted.

Figure 8:
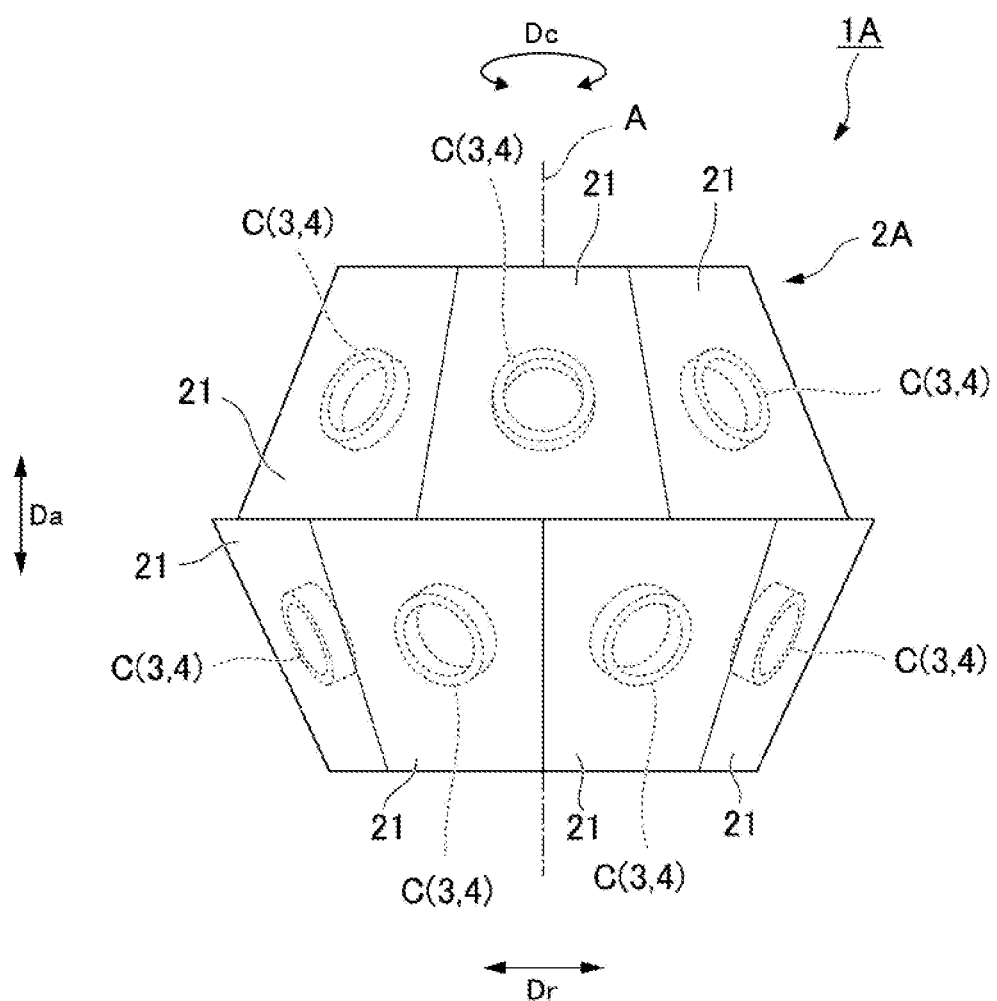
FIG. 8 is a side view showing a schematic configuration of an eddy current flow detecting probe according to a second embodiment of the present invention.

As shown in FIG. 8, in a coil holder 2A of the second embodiment, the dispositions of the holder bodies 21 in the circumferential direction Dc are different from each other between an upper portion (one side) and a lower portion (the other side) in the axial direction Da with the virtual horizontal plane P as a boundary. Specifically, as shown in FIG. 9, in the coil holder 2A, the dispositions of the holder bodies 21 in the circumferential direction Dc are shifted by half a cycle between the upper portion and the lower portion in the axial direction Da. Therefore, the center position of the second detection coil 42 disposed at the lower portion is disposed between the center position of the first excitation coil 31 disposed at the upper portion and the center position of the first detection coil 41 in the circumferential direction Dc. In the present embodiment, the center position of the second detection coil 42 in the circumferential direction Dc is disposed so as to coincide with a center between the center position of the first excitation coil 31 and the center position of the first detection coil 41 in the circumferential direction Dc. Therefore, in the present embodiment, the first center line 3a and the second center line 4a intersect each other to be inclined without being orthogonal to each other.

According to the eddy current flaw detecting probe, 3 in the probe unit U, the positions of the pair of detection coils 4 with respect to the pair of excitation coils are staggered. Therefore, it is possible to further disturb the distribution of the eddy current in the probe unit U in the circumferential direction Dc and the axial direction Da. As a result, in the case where there is a defect in the inspection target 8, the disturbance is easily generated in the eddy current, and the voltage difference is also enhanced between the detection coils 4. Accordingly, it is possible to improve the detection accuracy of the defect.

Other Modification Examples of Embodiment

Although the embodiments of the present invention are described above in detail with reference to the drawings, the respective configurations and combinations thereof in the respective embodiments are merely examples, and additions, omissions, substitutions, and other modifications of configurations can be made within a scope which does not depart from the gist of the present invention. Moreover, the present invention is not limited by the embodiments, but is limited only by claims.

In addition, the eddy current flaw detecting probe 1A is not limited to the multi-coil type having the same coils C as in the present embodiment. For example, a mutual induction type eddy current flaw detecting probe 1A may be adopted, in which the excitation coil 3 and the detection coil 4 having different coils C are disposed on a flat coil holder 2A. Therefore, the first excitation coil 31, the second excitation coil 32, the first detection coil 41, and the second detection coil 42 are not limited to the same coils C having the same electromagnetic characteristics, but may be coils C having different electromagnetic characteristics, respectively.

In addition, each of the excitation coil 3 and the detection coil 4 is not limited to be formed in an annular shape as in present embodiment. Each of the excitation coil 3 and the detection coil 4 may be formed in any shape. For example, each of the excitation coil 3 and the detection coil 4 may be formed in a rectangular annular shape.

Moreover, in the present embodiment, a gap is provided between the first excitation coil 31, the second excitation coil 32, the first detection coil 41, and the second detection coil 42 in the probe unit U. However if the first excitation coil 31, the second excitation coil 32, the first detection coil 41, and the second detection coil 42 are insulated to each other and it can be assumed that an electrical gap is provided therebetween, a physical gap may not be provided in each coil C.

In the present embodiment, a pipe formed of metal is exemplified as the inspection target 8. However, the inspection target 8 is not limited to the pipe. The inspection target 8 may be various members capable of performing the eddy current flaw detection.

INDUSTRIAL APPLICABILITY

According to the above-described eddy current flaw detection probe, it is possible to detect the defect positioned between the excitation coil and the detection coil with high accuracy.

REFERENCE SIGNS LIST 1, 1A: eddy current flaw detecting probe
2, 2A: coil holder
A: center axis
Da: axial direction
Dc: circumferential direction
Dr: radial direction
21: holder body
3: excitation coil
31: first excitation coil
32: excitation coil
3a: first center line
310: coil center line
4: detection coil
41: first detection coil
42: second detection coil
4a: second center line
410: coil center line
C, C2: coil
P: virtual horizontal plane
U: probe unit
U1: first unit
U2: second unit
8: inspection target
81: inspection target surface

What is claimed is:

1. An eddy current flaw detecting probe which is configured to approach an inspection target surface of an inspection target and detect a change of an eddy current generated in the inspection target, and thereby perform a flaw detection test, the eddy current flaw detecting probe comprising:
a coil holder having a tubular shape extending along a center axis;
a plurality of excitation coils which is configured to generate an alternating magnetic field so as to generate the eddy current in the inspection target; and
a plurality of detection coils, which are differentially connected,
wherein the plurality of excitation coils at least include:
a first excitation coil and
a second excitation coil which is disposed at a distance from the first excitation coil,
wherein the plurality of detection coils at least include:
a first detection coil which is disposed on a second center line intersecting a first center line which connects a center of the first excitation coil and a center of the second excitation coil to each other and
a second detection coil which is disposed on a side opposite to the first detection coil according to the first center line on the second center line,
wherein the coil holder includes a plurality of holder main bodies,
wherein the plurality of holder main bodies are combined with each other to be inclined so as to protrude outward in a radial direction perpendicular to the center axis, and
the excitation coils and the detection coils are fixed to the holder main bodies, there by the excitation coils and the detection coils are disposed so as to be inclined outward in the radial direction.

2. The eddy current flaw detection probe according to claim 1,
wherein a center position of the second detection coil is disposed between a center position of the first excitation coil and a center position of the first detection coil in a direction in which the first excitation coil and the first detection coil are adjacent to each other.

3. The eddy current flaw detection probe according to claim 1, further comprising:
wherein each of the plurality of excitation coils and the plurality of detection coils are fixed to an inner peripheral surface of the each holder main bodies such that a direction in which the first excitation coil and the first detection coil are adjacent to each other is a circumferential direction of the coil holder.

4. The eddy current flaw detection probe according to claim 3,
wherein the one of the excitation coils and the one of the detection coils are constituted by the coils which have same electromagnetic properties, and the plurality of excitation coils and the plurality of detection coils are disposed so as to be equally spaced apart over the entire circumference of the coil holder.

* * * * *